(12) United States Patent
Pouchak et al.

(10) Patent No.: US 8,251,297 B2
(45) Date of Patent: Aug. 28, 2012

(54) MULTI-STAGE BOILER SYSTEM CONTROL METHODS AND DEVICES

(75) Inventors: Michael A. Pouchak, Saint Anthony, MN (US); Jeffrey M. Hammer, Maple Plain, MN (US)

(73) Assignee: Honeywell International Inc., Morristown, NJ (US)

( * ) Notice: Subject to any disclaimer, the term of this patent is extended or adjusted under 35 U.S.C. 154(b) by 1463 days.

(21) Appl. No.: 10/826,416

(22) Filed: Apr. 16, 2004

(65) Prior Publication Data

US 2005/0230491 A1 Oct. 20, 2005

(51) Int. Cl.
*F23H 3/06* (2006.01)
*F23B 37/42* (2006.01)

(52) U.S. Cl. .......... 237/16; 237/2 A; 237/7; 237/8 A; 237/8 R; 122/448.1; 122/448.3; 431/60

(58) Field of Classification Search ............ 237/7, 12.1, 237/2 A, 8 A, 8 R; 122/448.1, 448.3; 431/60
See application file for complete search history.

(56) References Cited

U.S. PATENT DOCUMENTS

| | | | | |
|---|---|---|---|---|
| 3,162,430 A | * | 12/1964 | Wilkerson | 432/41 |
| 3,362,637 A | * | 1/1968 | Cornell | 237/2 R |
| 3,865,306 A | * | 2/1975 | Reuter et al. | 237/2 A |
| 3,997,109 A | * | 12/1976 | Hays | 237/8 R |
| 4,373,663 A | | 2/1983 | Hammer | |
| 4,513,910 A | | 4/1985 | Bartels | |
| 4,519,540 A | * | 5/1985 | Boulle et al. | 237/7 |
| 4,638,767 A | * | 1/1987 | George | 122/448.3 |
| 4,716,858 A | * | 1/1988 | Bartels | 122/448.1 |
| 4,787,554 A | * | 11/1988 | Bartels et al. | 236/26 R |
| 4,841,918 A | * | 6/1989 | Fukayama et al. | 122/406.5 |
| 4,930,488 A | * | 6/1990 | Pearman et al. | 126/39 E |
| 4,931,948 A | * | 6/1990 | Parker et al. | 700/277 |
| 5,016,577 A | * | 5/1991 | Hunt | 122/182.1 |
| 5,042,431 A | * | 8/1991 | Shprecher et al. | 122/448.3 |
| 5,053,978 A | * | 10/1991 | Solomon | 702/54 |
| 5,172,654 A | | 12/1992 | Christiansen | |
| 5,350,114 A | * | 9/1994 | Nelson et al. | 237/2 A |

(Continued)

FOREIGN PATENT DOCUMENTS

EP 0325356 7/1989

(Continued)

OTHER PUBLICATIONS

ES Engineered Systems, "Features Item: A New Look At Modular Boiler Systems," 10 pages, Mar. 2001.

(Continued)

*Primary Examiner* — Steven B McAllister
*Assistant Examiner* — Nikhil Mashruwala
(74) *Attorney, Agent, or Firm* — Seager Tufte & Wickhem LLC

(57) ABSTRACT

Methods and Systems for controlling boiler systems are disclosed. In one illustrative embodiment, a derivative action control is used reduce the likelihood of overshoot from a newly activated boiler. When a newly activated boiler becomes active, the boiler is held at a low firing rate for a predetermined period of time. The predetermined period of time may be cut short or even entirely eliminated under certain conditions. The methods and devices are further adapted for use in multi-stage boiler systems. In one embodiment, only the first stage of a multi-stage boiler system that becomes active is held at the low firing rate.

10 Claims, 7 Drawing Sheets

U.S. PATENT DOCUMENTS

| | | | |
|---|---|---|---|
| 5,452,687 A * | 9/1995 | Christiansen | 122/448.3 |
| 5,667,374 A * | 9/1997 | Nutcher et al. | 431/7 |
| 5,713,515 A | 2/1998 | Adams et al. | |
| 5,971,745 A * | 10/1999 | Bassett et al. | 431/12 |
| 6,021,752 A * | 2/2000 | Wahle et al. | 123/142.5 R |
| 6,062,485 A * | 5/2000 | Stege et al. | 237/2 A |
| 6,089,855 A * | 7/2000 | Becker et al. | 431/9 |
| 6,109,339 A * | 8/2000 | Talbert et al. | 165/48.1 |
| 6,536,678 B2 | 3/2003 | Pouchak | |
| 6,540,148 B1 * | 4/2003 | Salsbury et al. | 236/1 EA |
| 6,598,397 B2 * | 7/2003 | Hanna et al. | 60/651 |
| 6,647,302 B2 * | 11/2003 | Pouchak | 700/83 |
| 6,694,927 B1 * | 2/2004 | Pouchak et al. | 122/448.1 |
| 6,745,085 B2 * | 6/2004 | Pouchak | 700/21 |
| 6,904,874 B1 * | 6/2005 | Pouchak et al. | 122/448.2 |
| 7,819,334 B2 * | 10/2010 | Pouchak et al. | 237/8 R |
| 2002/0193890 A1 | 12/2002 | Pouchak | |

FOREIGN PATENT DOCUMENTS

| | | |
|---|---|---|
| EP | 0614047 | 9/1994 |
| WO | WO0194847 | 12/2001 |

OTHER PUBLICATIONS

Lochinvar, "Intelli-Fin Gas Fired Boilers," 6 pages, Apr. 2003.

Lochinvar, "Intelli-Fin Sequencing Options Mean New Levels of Building Efficiency," 2 pages, Nov. 2002.

Slant Fin Terra Thelma, Typical Applications, 15 pages, Feb. 2002.

Triad Boiler Systems Inc., "Modular Steel Firetube Packaged Boiler Systems," 3 pages, Mar. 12, 2004.

Lochinvar Corporation, "LonWorks System Integrator Guide for the Intelli-Fin Boiler Interface Controller", Version LOCH SIG-01, pp. 1-59, Jun. 2001.

Ashrae Systems and Equipment Handbook, "Boilers", Chapter 27, pp. 27.1-27.6, 1996.

Engineering Manual of Automatic Control, "Chiller, Boiler, and Distribution System Control Applications", pp. 332-335, prior to filed of current application.

Ashrae Applications Handbook, "Service Water Heating", pp. 48.21-48.22, 1999.

* cited by examiner

MULTI-STAGE BOILER SYSTEM CONTROL METHODS AND DEVICES

FIELD

The present invention is related to the field of heating and/or hot water boilers, and more particularly, to methods and devices for controlling multi-stage boiler systems.

BACKGROUND

Recent innovations in boiler technologies have led to the introduction of modular boiler systems making use of several small boilers for applications where, in the past, a single, larger boiler may have been used. Such modular systems are often adaptable for changing uses over time when, for example, an addition may necessitate greater boiler capacity than that originally needed in a building.

One of the challenges with multi-stage systems such as modular systems is the need to meet changing heat loads over time in a stable and efficient manner. In a given system, different times of the day may require different amounts of heat production. For example, given a relatively simple example of a three boiler system, during setback periods (e.g. night), only one of the boilers may be needed to satisfy the heat load of the building. During a warmup period (e.g. early morning) following a setback period, all three boilers may be needed, while during ordinary operation (e.g. late morning), only two boilers may be needed, and during light ordinary operation (e.g. mid-afternoon) a single boiler may be sufficient.

Control of such boiler systems can be further complicated by the relative efficiencies of certain boilers. For example, FIG. 1 is an illustrative graph of efficiency data for an example commercial boiler. It can be seen that efficiency may improve as return water temperature drops, while efficiency may drop as the percentage of total output capacity increases. It should be noted that a minimum firing rate is also sometimes needed for stability and safety purposes. Meanwhile, difficulties can arise with return water temperatures at low firing rates, as explained by Pouchak, et al., in U.S. Pat. No. 6,694,927, which is incorporated herein by reference.

When a system operates with a relatively light heat load, the characteristics of the system and boilers can create difficulties or inefficiencies. Often, the built-in deadband of a system creates a delay between an increase in load and an increase in system capacity. For example, if all boilers are off and a call for heat occurs in a lightly loaded situation, the deadband typically causes the system to wait before turning on a first boiler. By the time the first boiler comes on, however, system temperatures may be relatively far from their setpoints, and the firing rate of the first boiler turned on will quickly ramp up. If the heat load is small, however, the load can be quickly met and the boiler turned off. This cycle is inefficient and may create undesired system temperature variations.

SUMMARY

The present invention, in an illustrative embodiment, includes methods of controlling boilers newly added to the operating set of a multi-boiler system. In a first embodiment, a derivative action control is used reduce the likelihood of overshoot. In another embodiment, when a boiler is brought online, a newly active boiler is held at a low firing rate for a predetermined period of time. In a yet another illustrative embodiment, the predetermined period of time may be cut short under certain conditions.

DETAILED DESCRIPTION

The following detailed description should be read with reference to the drawings. The drawings, which are not necessarily to scale, depict illustrative embodiments and are not intended to limit the scope of the invention.

Copending U.S. patent application Ser. No. 10/809,115, entitled MULTI-STAGE BOILER STAGING AND MODULATION CONTROL METHODS AND CONTROLLERS, published as US 2005-0230490 A1, is incorporated herein by reference. Copending U.S. patent application Ser. No. 10/809,116, entitled COLD WATER BYPASS AND FIRING RATE CONTROL, now U.S. Pat. No. 6,904,874, is also incorporated herein by reference. These patent applications illustrate some interface and control methods for individual and multi-stage boiler systems. U.S. Pat. Nos. 6,536,678 and 6,694,927 illustrate several example boiler control systems and methods, and are also incorporated herein by reference.

Figure 1:
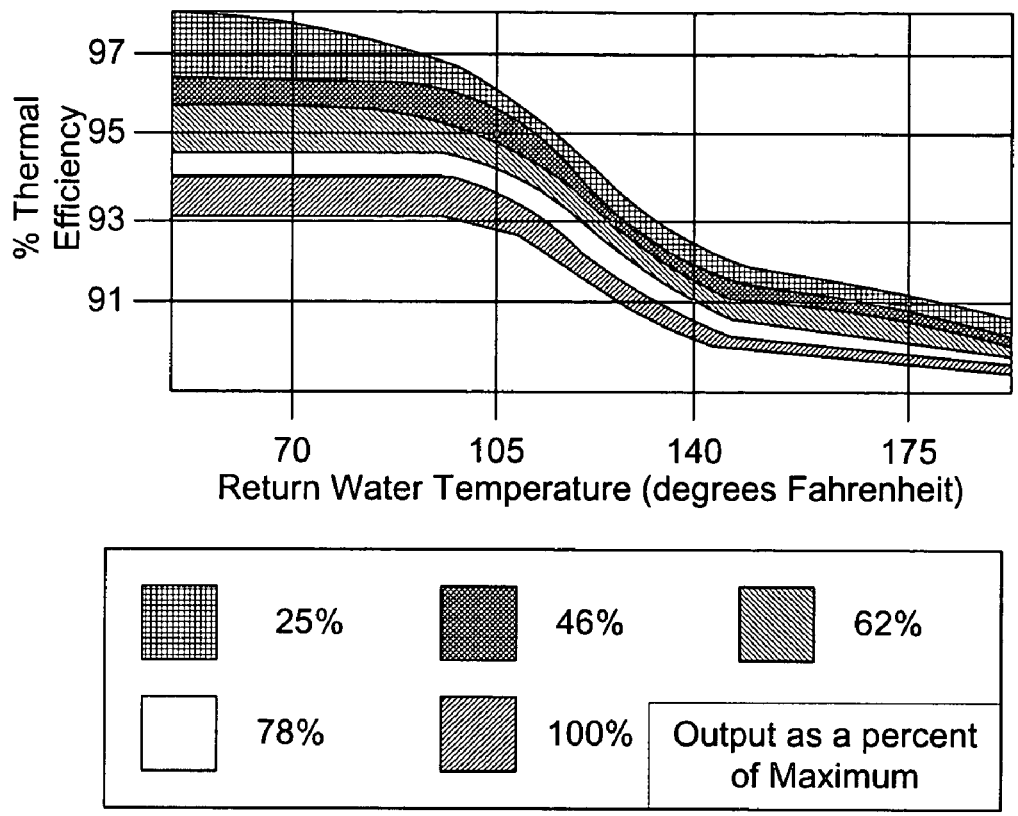
FIG. 1 is a graph of efficiency data for an example commercial boiler.

FIG. 1 is a graph of efficiency data for an example commercial high efficiency condensing boiler. It can be seen that as input water temperatures drop, efficiency generally improves. Further, as the firing rate drops, efficiency also improves. Due to exhaust/ventilation needs, however, the boiler may have a minimum firing rate level. For the commercial boiler of FIG. 1, a minimum firing rate occurs at about 25% of heat output capacity. Reducing blower output, fan speeds, and gas feed below this level can create potential hazards including the poor venting and accumulation of fumes resulting from spent fuel. A minimum firing rate is typically set for the boiler such that there is a minimum heat output for the boiler.

Figure 2:
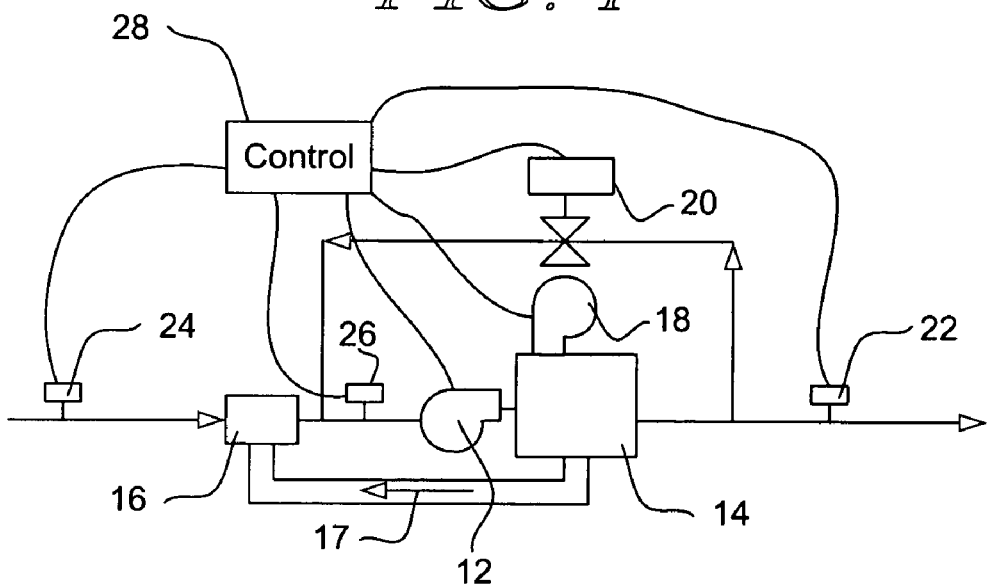
FIG. 2 is a schematic diagram of an illustrative high efficiency condensing boiler.

FIG. 2 is a schematic diagram of a high efficiency condensing boiler. The system includes a pump 12 for moving water through a primary heat exchanger 14. Flue gasses 17 from the primary heat exchanger 14 are directed to a secondary heat exchanger 16 placed in the return water path for the system. Firing rate and flue gas flows are controlled using a combustion/purge blower 18. The firing rate may also be controlled using various valves for controlling fuel flow, fuel/air mixers, etc. (not shown).

A bypass valve 20 is used to direct output water back to the return flow before it enters the primary heat exchanger 14, as needed, to keep the temperature of fluid entering the primary heat exchanger 14 above a predefined set point. Several sensors 22, 24, 26 may be provided to relay signals to a controller 28. The controller 28 may control several system components including the pump 12, blower 18, and bypass valve 20, and other boiler components such as gas valves, ignition controls, fuel/air mixers, etc.

The combustion/purge blower 18 may be a variable frequency drive unit that can provide a variable firing rate for the boiler. When the variable frequency drive of the blower 18 operates at an increased level, the blower 18 increases the heating output of the boiler and forces a greater amount of flue gasses 17 to the secondary heat exchanger 16. The blower 18 works in conjunction, typically, with other devices for mixing air and fuel, controlling ventilation, etc.

During operation, the secondary heat exchanger 16 typically warms inlet water before it enters the primary heat exchanger 14 by heat exchange with flue gasses 17. As the flue gasses 17 pass through the secondary heat exchanger 16, condensate can form inside the secondary heat exchanger 16. The secondary heat exchanger 16 is usually designed or adapted to handle condensation without becoming damaged.

For the purposes herein, the sensor that senses the fluid temperature prior to the secondary heat exchanger 16 may be referred to as the inlet sensor 24. The sensor that senses the fluid temperature of the mix of circulating fluid coming from the secondary heat exchanger 16 and fluid passed back through the bypass valve before it enters the primary heat exchanger 14 may be referred to as the bypass sensor 26. The sensor that senses the fluid temperature after the primary heat exchanger 14 may be referred to as the output sensor 22.

If the temperature sensed by the bypass temperature sensor 26 is too low, condensation may occur in the primary heat exchanger 14. Such condensation may occur when the bypass temperature falls below one-hundred thirty degrees Fahrenheit (fifty-five degrees Celsius), and some times blow around one-hundred twenty degrees Fahrenheit (forty-nine degrees Celsius). Such condensation in the primary heat exchanger can, in some cases, damage the primary heat exchanger 14. As such, when the bypass temperature sensor 26 senses a temperature that is approaching a predefined bypass temperature limit, the bypass valve 20 may open to a greater degree to allow heated output water to feed back to the return flow and warm the temperature sensed at the bypass temperature sensor 26. If the bypass valve 20 is already fully open, the firing rate of the boiler may also be adjusted to increase the heat output of the boiler, and thus the temperature of the water that is fed back to the return flow. Copending U.S. patent application Ser. No. 10/809,116, entitled COLD WATER BYPASS AND FIRING RATE CONTROL, now U.S. Pat. No. 6,904,874, which is expressly incorporated herein by reference, illustrates various methods for overcoming low bypass temperatures and avoiding condensation in the primary heat exchanger 14.

Figure 3:
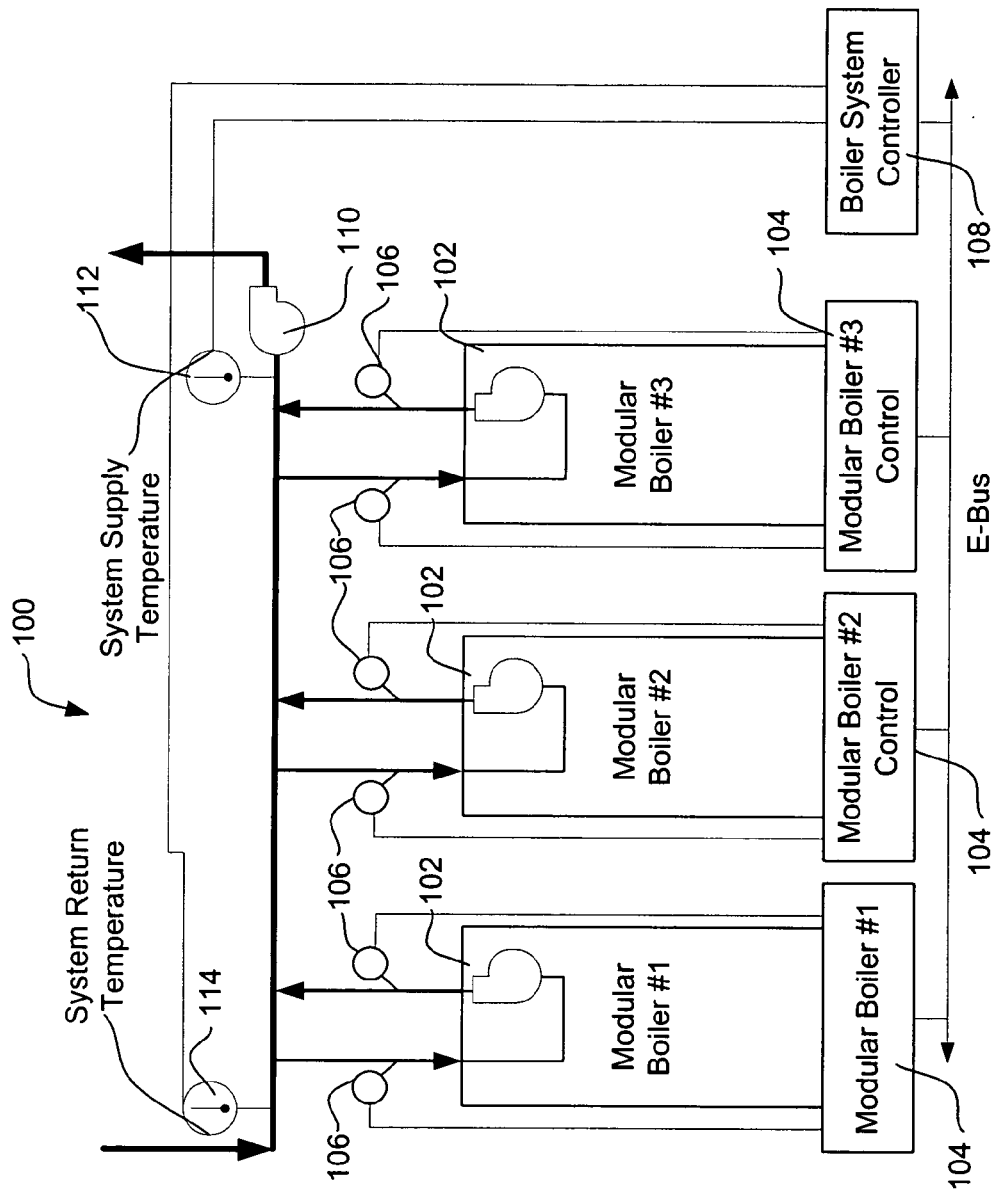
FIG. 3 is a schematic diagram of an illustrative boiler system incorporating more than one boiler.

FIG. 3 is a schematic diagram for a boiler system incorporating more than one boiler. The illustrative system 100 includes a number of modular boilers 102 which may, in terms of the system 100, be referred to as "stages" of the system 100. In the illustrative embodiment, each boiler 102 includes a boiler control 104, which is coupled to a corresponding temperature sensor 106 for monitoring fluid temperatures to and from the corresponding boiler 102. In the illustrative embodiment, the boiler controls 104 are connected via a bus (E-bus) to a boiler system controller 108. A pump 110 may be provided separate of the internal pumps of the modular boilers 102 to help provide consistent fluid flow regardless of how may of the boiler stages 102 are currently active. If desired, the boiler system controller 108 may also be coupled to and help control the pump 110, if desired.

In the illustrative embodiment, the boiler system controller 108 is coupled to a system supply temperature sensor 112 and a system return temperature sensor 114. The outputs of either or both of the sensors 112, 114 may be used by the boiler system controller 108 to determine the present load conditions. Various other sensors may also be used independently or in conjunction with sensors 112, 114. Typically, the system return temperature sensor 114 provides a return temperature signal that can be compared to a desired return temperature set point, and the operation of the system 100 may be adjusted by the boiler system controller 108 to meet the desired return temperature set point.

In the illustrative embodiment, the boiler system controller 108 sends both enable/disable (or active/inactive) control signals as well as an output capacity or firing rate signal to each of the boiler controllers 104 via the E-bus. When the boiler system controller 108 calls for a selected boiler 102 to be active, the corresponding boiler controller 104 activates the selected boiler 102. Once activated, the circulating fluid enters the selected boiler 102, is heated, and is pumped out by the pump 110. While a parallel configuration is illustrated in FIG. 3, any of a number of parallel, series, or combination parallel/series boiler configurations may be used and still be within the scope of the present invention.

Figure 4A:
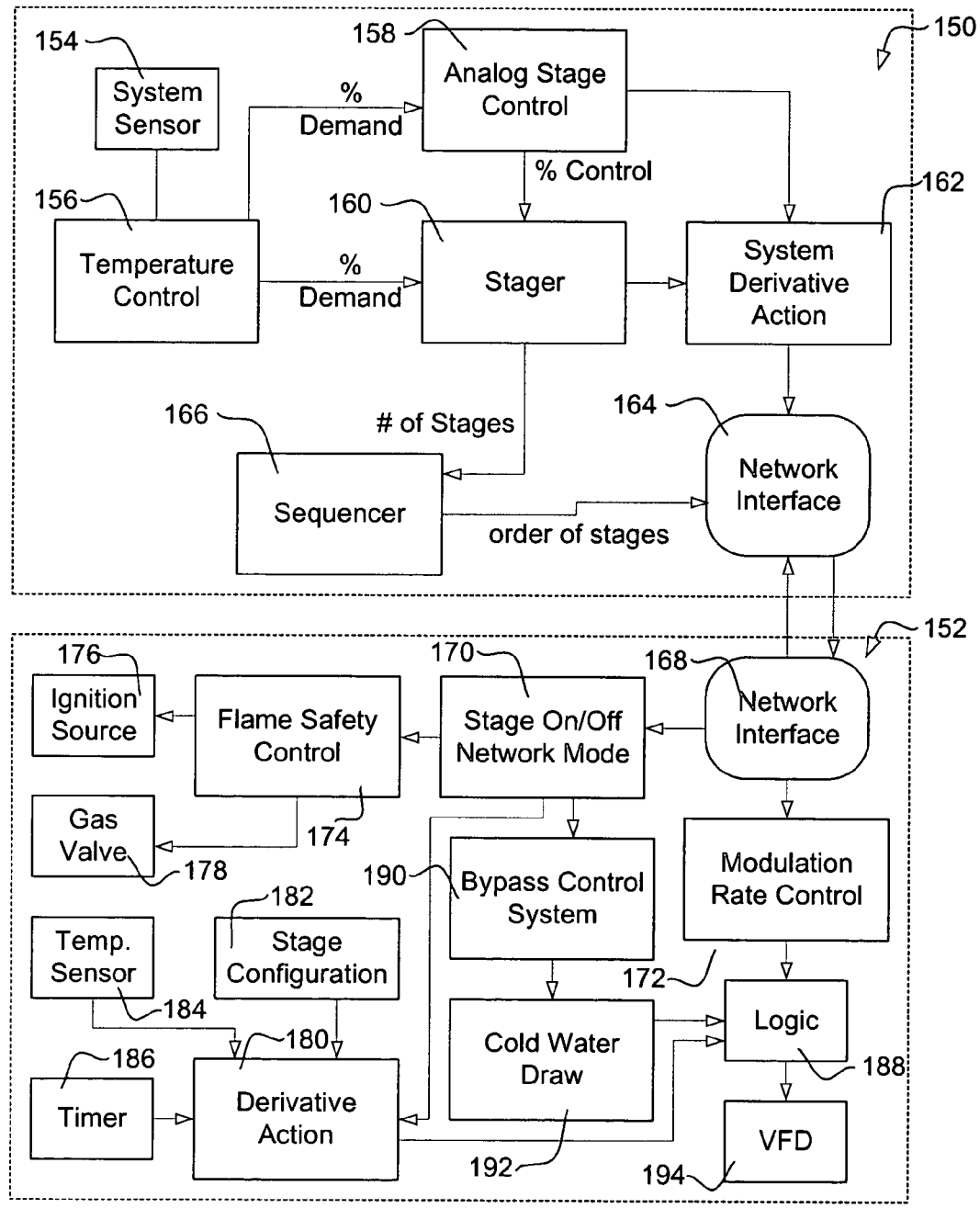
FIGS. 4A-4B show a block diagram for an illustrative boiler control system.
Figure 4B:
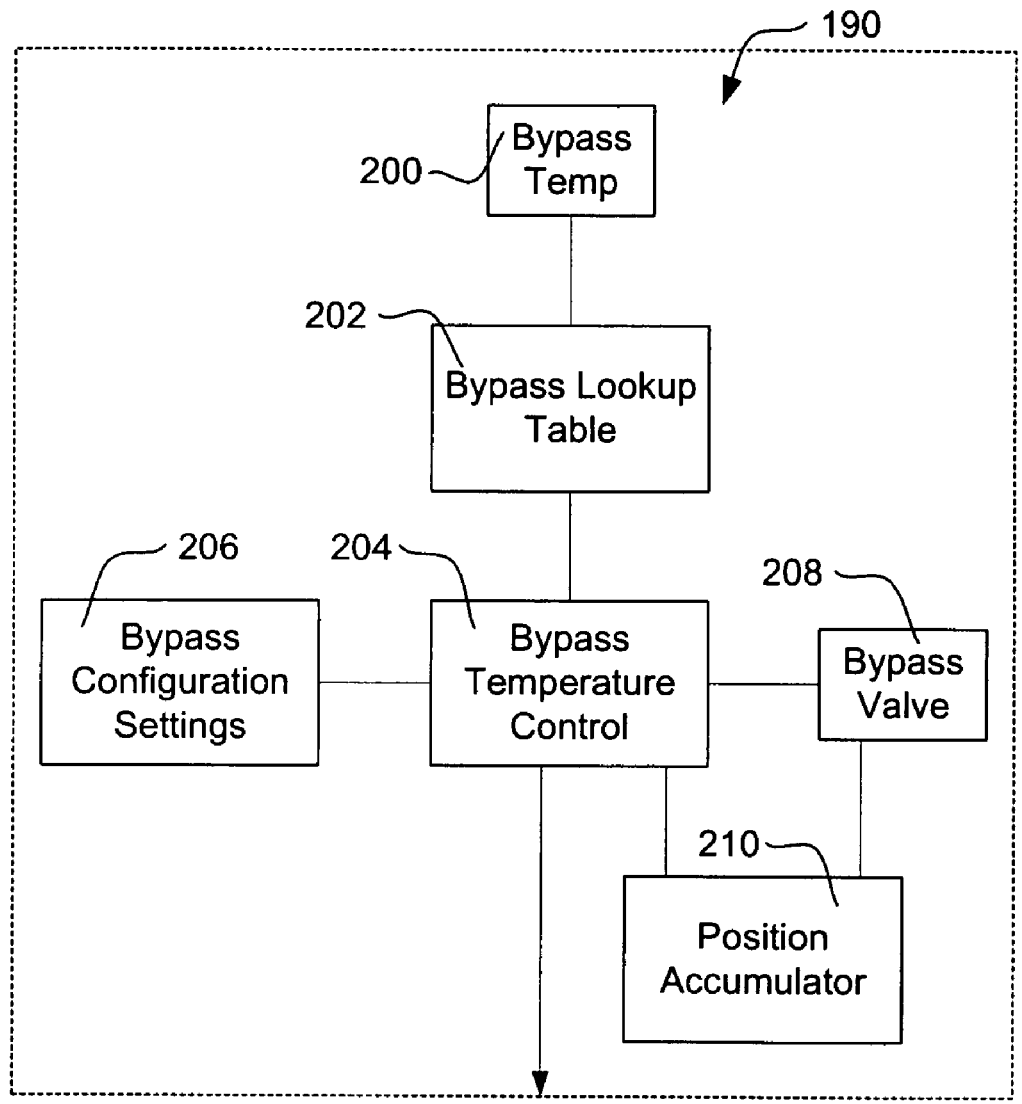

FIGS. 4A-4B show a block diagram of an illustrative boiler control system. The illustrative boiler control system is divided into two main blocks, a system control block 150 and a stage control block 152. In the system control block 150, a system sensor block 154 provides a sensed temperature to temperature control block 156, which may be configured to calculate an error signal, which may relate, for example, a proportional and integral derivative error. Alternatively, or in addition, the temperature control block may simply look up an error signal via a look-up table or the like.

In the illustrative embodiment, the temperature control block 156 sends a percent error or demand signal to an analog stage control block 158 and a stager block 160, as shown. The analog stage control block 158 generates a percent demand signal that is sent to the stager block 160 as well as a system derivative action block 162. The stager block 160 determines how many stages should be called, and determines whether to add or remove stages in response to the error signal. Some illustrative staging methods are shown in copending U.S. patent application Ser. No. 10/809,115, entitled MULTI-STAGE BOILER STAGING AND MODULATION CONTROL METHODS AND CONTROLLERS, published as US 2005-0230490 A1.

The illustrative embodiment also shows that the stager block 160 may create a signal indicating whether a new stage should be called, and may provide that signal to the system derivative action block 162. In one illustrative embodiment, the stager block 160 only provides this signal if a transition from no active stages to one active stage occurs. If the system derivative action block 162 is enabled, and determines that limited firing rates may be appropriate, the percent control signal received from the analog stage control block 158 may be modified before it is sent to the network interface block 164. Illustrative methods for making such a determination are further explained below with reference to FIGS. 5 and 6.

In one illustrative configuration of the system, the system derivative action block 162 may generate a signal to reduce the percent control signal received from the analog stage control block 158 to a level that is selected to limit the firing rate of a newly activated stage. In another illustrative configuration, the system derivative action block 162 may not be enabled, and the control signal received from the analog stage control block 158 is passed unchanged to the network interface block 164.

If a runtime equalization setting is desired, a sequencer block 166 may identify which stages to call/activate/enable to equalize runtime among the stages. The sequencer block 166 also may send a signal to the network interface block 164 indicating how many and which stages to activate/enable. If a other settings are desired the sequencer block 166 may enable such settings, for example to identify which stages to activate or de-activate to create first-on/first-off or first-on/last-off sequencing.

The network interface block 164 of the system block 150 may be coupled to a network interface block 168 in each boiler stage 152. In some embodiments, there may be several boiler stage blocks 152 connected to a single system block 150. The connections may be serial or parallel connections, as desired. One illustrative system makes use of an Echelon Lonworks™ compatible bus, which is a relatively simple two wire bus system.

In the illustrative embodiment, the network interface block 168 in boiler stage 152 is coupled to a stage on/off network mode block 170 and a modulation rate control block 172. The stage on/off network mode block 170 controls whether the boiler stage 152 is on or off. The stage on/off network mode block 170 also provides a signal to the flame safety control block 174, which in turn operates and monitors an ignition source 176 and a gas valve 178.

The stage on/off network mode block 170 may also provide a signal to a stage derivative action block 180. In one illustrative embodiment, the stage derivative action block 180 is disabled and, the system derivative action block 162 of system control block 150 may control stage firing rates by, for example, artificially lowering the analog stage control signal as desired or when needed.

In some cases, however, the derivative action block 180 may be enabled. In such cases, signals may be taken from the stage on/off network mode block 170 to determine whether the boiler stage 152 is newly called and, optionally, whether the stage 152 is a first-called stage. If the derivative action block 180 determines that derivative action is proper under the circumstances (again, examples of the decisions made in the derivative action block 180 are explained below with reference to FIGS. 5 and 6), then the derivative action block 180 may, for example, check a stage configuration signal to determine whether the timer 186 is enabled, as well as determine the settings for derivative action since these may also be configured by a user. The derivative action block 180 may also receive signals from a temperature sensor 184 to determine if derivative action block 180 should be disabled due to temperature variations in the circulating/working fluid of the boiler system. Also, the derivative action block 180 may check a timer 186 to determine if the period for action has expired.

Some example conditions where derivative action is enabled include: operation within a set time period after a first stage is added along with operation while temperatures of the circulating/working fluid of the boiler system are not dropping quickly. If the conditions for action are all met, then the derivative action block 180 may send a signal to logic block 188 indicating that the firing rate should remain low. This signal is used to override the signal sent to logic block 188 from modulation rate control block 172 to provide a desired heat output level or firing rate.

In one embodiment, the boiler stage 152 may further include a bypass control system 190 that provides one or more signals to both a cold water draw block 192 and the stage on/off network mode block 170. The bypass control system 190 is further illustrated in FIG. 4B, which is further described below. If desired, the stage on/off network mode block 170 may disable the derivative action block 180 if commanded by the bypass control system 190. Alternatively, the bypass control system 190 may signal to logic block 188, via the cold water draw block 192, that the derivative action block 180 may be overridden. Logic block 188 makes the determination of what the variable firing rate demand 194 should be to control the firing rate of the stage 152.

As noted, a first source for the logic block 188 may be the modulation rate control block 172, which provides a heat load signal related to the load signal generated by the analog stage control 158 as modified (potentially) by the system derivative action 162. The signal from block 172 may be overridden or modified by either the bypass control system 190 or the derivative action block 180, when enabled. In one embodiment, the bypass control system 190 receives highest priority because it is responsible for protecting the boiler or stage 152 from damage caused by, for example, condensation in the primary heat exchanger.

FIG. 4B shows several features of an illustrative bypass temperature control block 190. In the illustrative embodiment, a sensed bypass temperature 200 is compared to a set point (not shown) and/or sent to a lookup table 202 (this may include calculating a rate or integral error on the bypass temperature 200, if desired), and the resulting signal or signals are sent to a bypass temperature control block 204 which is adapted to determine the desired position of the bypass valve 208. The bypass temperature control 204 receives configuration settings 206 that may include the current position of the bypass valve 208, system operation history analysis, system settings, user preferences, and/or any other settings, parameters and/or characteristics, as desired.

If the bypass temperature 200 is in a range where adjustment of the bypass valve 208 is desired, the bypass temperature control 204 may send a signal to change the position of the bypass valve 208. The signal for changing the position of the bypass valve 208 may also be received and recorded by a position accumulator 210. The position accumulator 210 may provide a signal that indicates a current position of the bypass valve 208. For example, the position accumulator 210 may indicate that the bypass valve 208 is open by a certain percentage, or by some other scale as desired.

If the bypass temperature control 204 determines that the bypass temperature 200 is well above a temperature where condensation in the heat exchanger is likely to occur, the bypass temperature control 208 may call for the bypass valve 208 to partly or fully close. On the other hand, if the bypass temperature 200 is or has been dropping into a range where a higher bypass temperature would be desirable to help prevent condensation in the primary heat exchanger, the bypass temperature control 204 may call for opening the bypass valve 208 further from its current position. If the bypass valve 208 is already fully open, the bypass temperature control 204 may call for an increase in the stage firing rate to increase the temperature of the water that is fed back to the water return.

In one embodiment, as explained in co-pending U.S. patent application Ser. No. 10/809,116, entitled COLD WATER BYPASS AND FIRING RATE CONTROL, now U.S. Pat. No. 6,904,874, the bypass temperature control may include or operate in parallel with an inlet temperature sensor. In such a method, if the inlet temperature drops below a predefined level, then the firing rate may be raised right away, rather than waiting for the bypass valve to open completely. The call for increased firing rate, as further explained above and below, may override a derivative action call for reduced firing rate.

Figure 5:
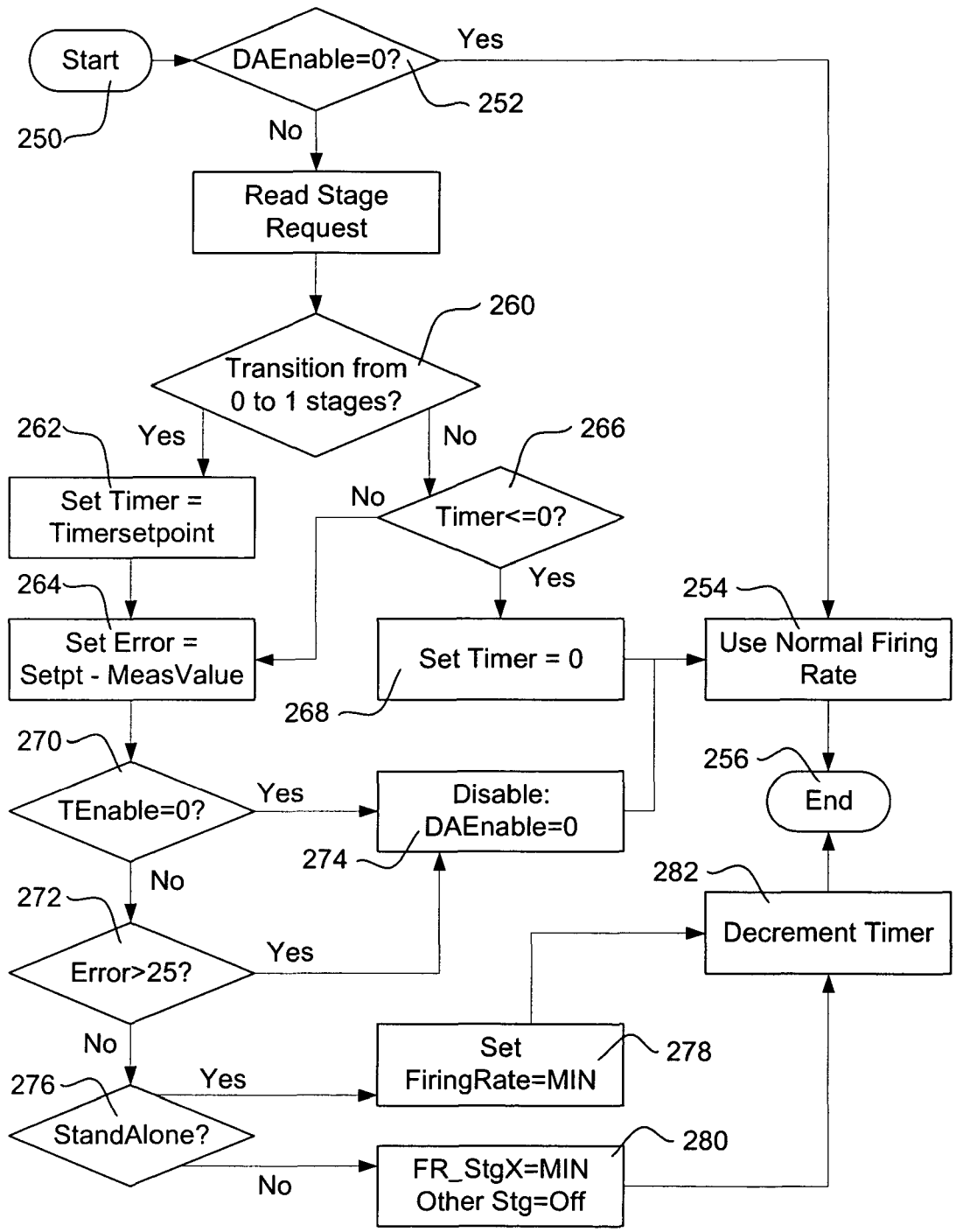
FIG. 5 is a block diagram for an illustrative firing rate control for a boiler.
Figure 7:
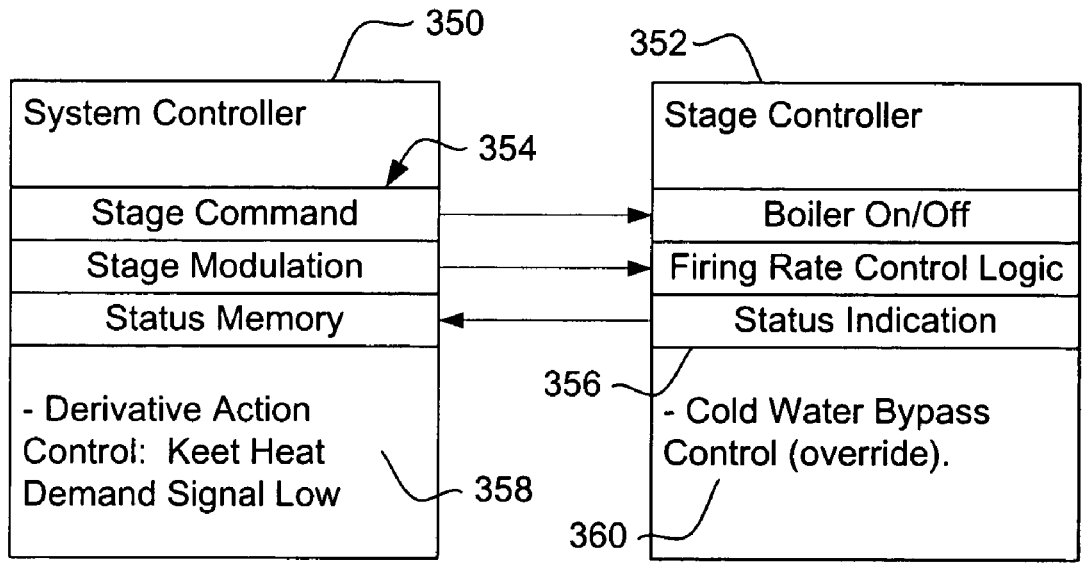
FIGS. 7-8 show illustrative configurations of system/stage control for a boiler system.
Figure 8:
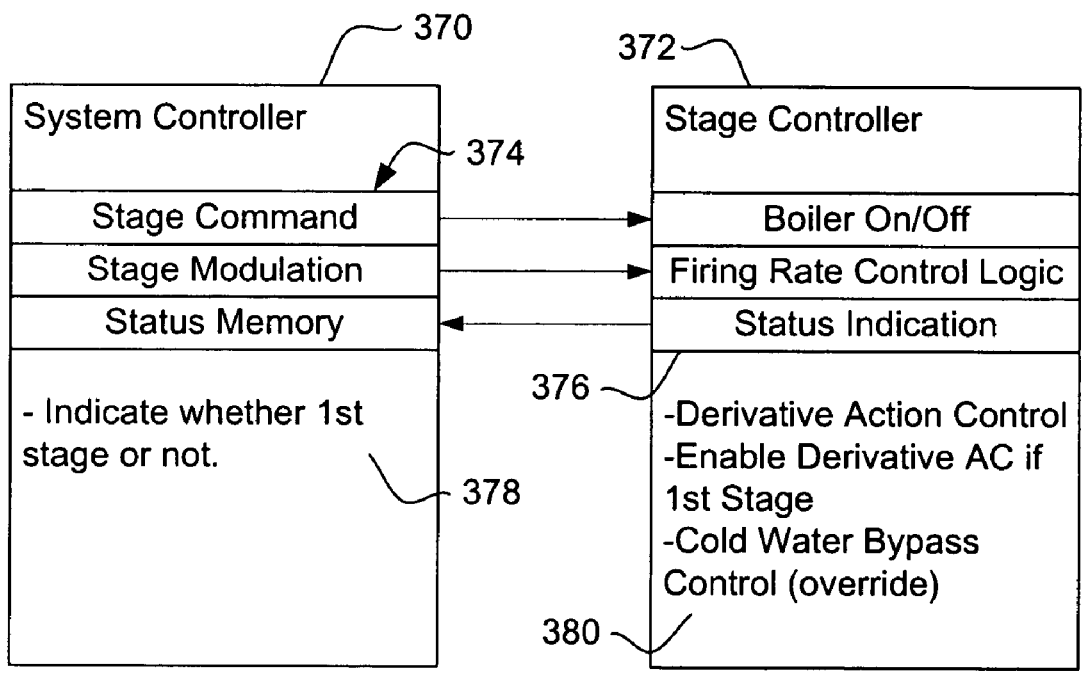

FIG. 5 is a flow diagram showing an illustrative method for performing firing rate control for a boiler that is adapted to limit the firing rate of the boiler during a time period after a stage is first activated. The control method is illustrated as a number of steps, and may be implemented in several ways by allocating control steps to different parts of a boiler system including a system controller and/or a stage controller. Two illustrative allocations of control using both a system controller and a stage controller are illustrated in FIGS. 7-8.

The method shown in FIG. 5 is repetitively executed at a predetermined interval, each time beginning at start block 250. The predetermined interval may vary as desired. In some embodiments, the predetermined interval is chosen to be shorter than a staging/modulation control interval at which overall staging and modulation are calculated and performed. For example, in one embodiment, the predetermined interval may be about five seconds, while the interval for the overall staging/modulation control may be about fifteen seconds. Alternatively, the overall staging may have a first interval, modulation may have a second interval, and the firing rate control may have a third interval shorter than the first and/or second intervals. In an illustrative embodiment, the first interval is about fifteen seconds, the second interval is about five seconds, and the third interval is about five seconds or less. Other values may be used, as desired. As the intervals decrease in time, the system accuracy may increase, however, efficiency may be reduced due to accelerated cycling.

Control is passed from the start block 250 to a first decision block 252, which checks whether derivative action is enabled. If derivative action is not enabled (DAEnable=0), control is passed to block 254 which allows the normal firing rate to be used. Control is passed from block 254 to end block 256, and the method is terminated until the beginning of the next interval.

Referring back to decision block 252, if derivative action is enabled, the stage request is read as shown at 258. Next, control is passed to block 260, which determines if the system is transitioning from no active stages to one active stage. If so, control is passed to block 262, which sets a timer to a timer setpoint. The timer setpoint may represent a delay that must occur before the firing rate may be increased for a newly activated first stage. In one embodiment, the timer setpoint may be set to about two minutes, while greater and lesser values may be used as desired.

Having set the timer at 262, the method continues by setting the error as the difference between a desired set point and a measured temperature value. In some embodiments, the measured temperature value correspond to the system return temperature or the system supply temperature (e.g. sensors 114, 112, respectively, in FIG. 3).

Returning to block 260, if there is no transition from zero active stages to one active stage during this interval, the method checks to see whether the timer is less than or equal to zero, as shown at 266. If the timer is not less than or equal to zero, the timer has not yet expired, and control is passed to block 262. If the timer is less than or equal to zero, the timer is set to zero as shown at 268 (avoiding possible overflow errors), and control is passed to block 254 where the normal firing rate is used as shown at 254, and control is passed to end block 256.

Referring back to the set error block 264, the next step is to check whether the timer is disabled by comparing TEnable to zero, as shown at 270. If the timer is disabled (TEnable=zero), the derivative action is disabled at block 274, and continues using the normal firing rate as shown at block 254. If the timer is not disabled (TEnable is not equal to zero), the method compares the error to a predetermined error value. In the illustrative embodiment, the predetermined error value is twenty-five degrees Fahrenheit, though other error values may also be used, as desired. If the error is too great, the derivative action is disabled by setting DAEnable=zero at block 274, and then control is passed to block 254 where the normal firing rate is used.

If the error is less than the predetermined error value (e.g. 25 degrees F.), the method determines whether the stage is a standalone boiler as shown at 276 (i.e. whether the system is not a multi-boiler or multi-stage system). If the stage is a stand alone boiler, the firing rate is set to a minimum value at block 278. In some cases, the minimum value may correspond to a minimum firing rate for the boiler. Several commercial boilers have a minimum firing rate of about 25% of their maximum firing rate, but other minimum values may also be used. If the stage is not a standalone boiler, the method sets the firing rate for the boiler stage (stage X) that has been just activated to its minimum value (FR_StgX=MIN), and sets other stages to OFF, as shown at 280. The other stages are set to off because at decision block 260, it was determined that the system is transitioning from no active stages to one active stage.

Coming from either block 278 or block 280, the timer is decremented as shown at block 282. Then, the method comes to end block at shown at 256 and waits for the beginning of the next interval. As noted above, the various steps may be performed by controllers, sensors, and/or logic at either a system control level or a stage control level, or a combination thereof, as desired. FIGS. 7 and 8 illustrate two example configurations.

Figure 6:
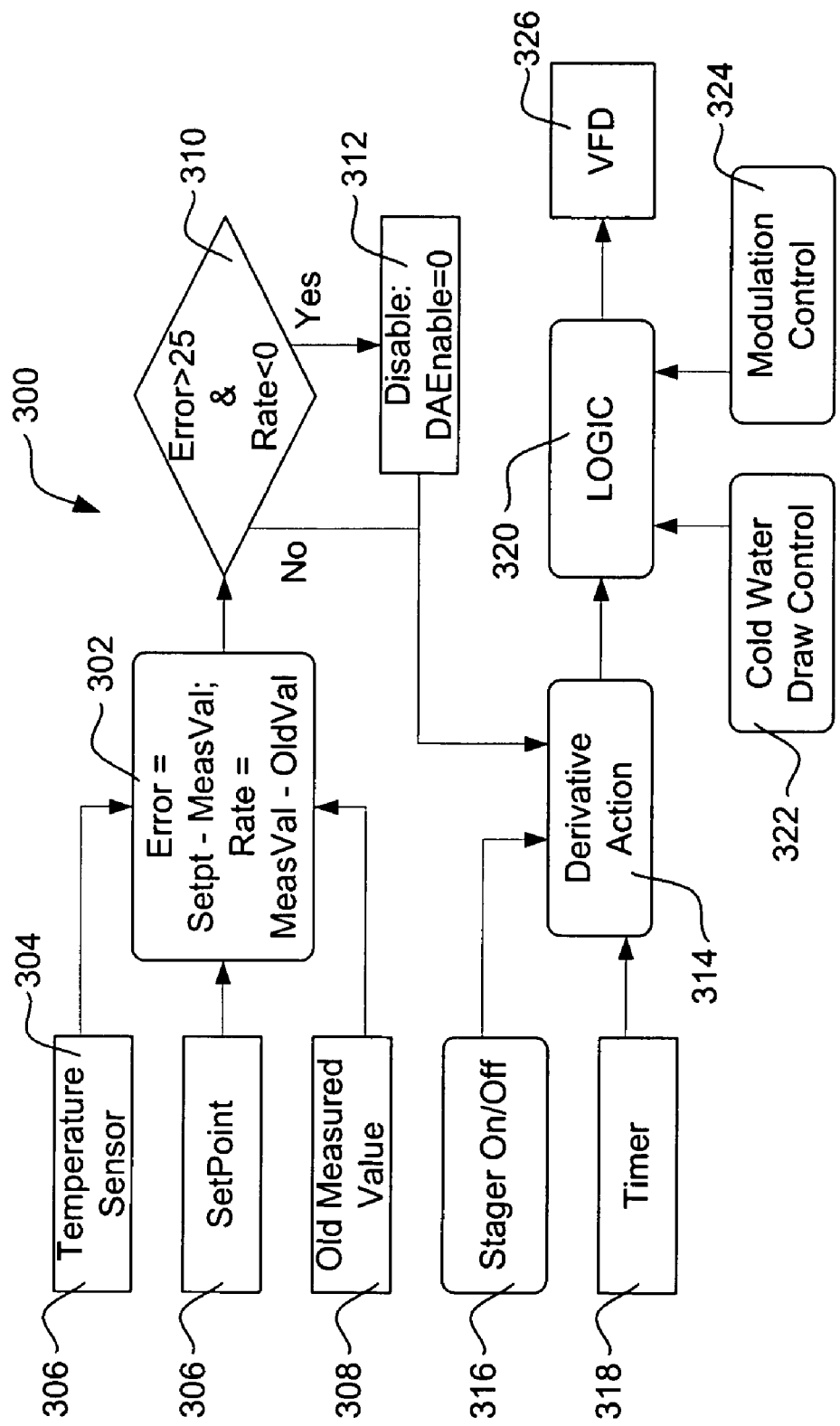
FIG. 6 shows in block form an illustrative stage control.

FIG. 6 shows in block form an illustrative stage control method for disabling derivative control. The method 300 begins with an error calculation 302 which takes the output of a temperature sensor 304 and compares it to a desired set point 306. An old measured value 308 is also read in. The error is set to the difference between the set point 306 and the measured value, and a rate value is set as the difference between the measured value and the old measured value 308, as shown at 302.

A comparison step 310 comes next. In the illustrative embodiment, if the error is greater than twenty-five degrees Fahrenheit, and the temperature is dropping, then the derivative action is disabled as shown at 312. If the output of the comparison step 310 is a "no", or after the disable step 312, control is passed to the derivative action block 314.

The derivative action block 314 receives signals from a stager on/off block 316 and a timer 318. The stager on/off block 316 provides a signal indicating if derivative action 314 is otherwise appropriate, such as if the current stage is being activated and, in one embodiment, if the current stage is the first stage activated. The timer 318 is used by the derivative action 314 to determine how long derivative action should continue. Using these signals to indicate whether derivative action is enabled, appropriate, and should continue, the derivative action block 314 sends a signal to logic 320.

In the illustrative embodiment, logic 320 receives signals from each of the derivative action block 314, cold water draw control 322, and modulation control 324, and uses these signals to determine a firing rate demand to send to the VFD 326. As noted above, the cold water draw logic 322 may generate a call for increased firing rate to avoid condensation in a boiler. The modulation control 324 may be controlled in various ways. Some illustrative modulation control methods are shown in copending U.S. patent application Ser. No. 10/809,115 entitled MULTI-STAGE BOILER CONTROL STAGING AND MODULATION METHODS AND CONTROLLERS, published as US 2005-0230490 A1, which is incorporated herein by reference.

FIGS. 7-8 illustrate configurations for system and stage control for a multi-stage boiler system. As shown in FIG. 7, the system controller 350 and stage controller 352 interact in several illustrative fashions. Commands, status and information are exchanged between system configuration 354 and stage configuration 356. The example shown illustrates that the system controller 352 may send a stage command to the stage controller 352 indicating whether a boiler stage should be on or off. Also, the system controller 350 may send a stage modulation signal that is used in the stage controller 352 by firing rate control logic to control the firing rate of the stage. The stage controller 352 may send status indications to a status memory in the system controller 350.

For the example of FIG. 7, the system controller 350 and stage controller 352 are configured to allocate derivative action control to the level of the system controller 350. In particular, the system controller 350 is configured with derivative action control to keep the heat demand signal relatively low for a predefined time period, with certain exceptions, as shown at 358. Some illustrative exceptions including: a continuing drop in circulating fluid temperatures after a boiler stage is activated; whether or not a stage newly activated is the first stage activated; and user overrides.

Further, because the system controller 350 may receive calls for heat from multiple sensors, certain calls may be of a type indicating that derivative action control is either not needed or undesirable. For example, a system may receive a call for heat from a small area (single office heat) and a large area (gymnasium heat). The system may elect to use derivative action only when the small area calls for heat.

Meanwhile, the stage controller 352 may be optionally configured with a cold water bypass control override as shown at 360, and may not have a derivative action block enabled, though such functionality may be programmed (or hardwired, as desired) into the stage controller 352.

In contrast to FIG. 7, the configuration of FIG. 8 operates differently. In particular, the system controller 370, while having a set of stage and status commands and memory shown at 374, interacts with the stage controller 372, also having certain command receiving and status indicators. In the illustrative example of FIG. 8, the system controller 370 simply indicates whether the stage controller 372 is the first stage activated or not, as shown at 378. The stage controller 372, as shown at 380, has the derivative action control which is enabled if the stage is the first stage called, and in the illustrative embodiment, also retains the optional cold water bypass control override.

In some cases, the controllers 350, 352, 370, 372 may be readily adjusted for either configuration. When so provided, this may allow the individual components to be used with a variety of systems. For example, the system controller 350 may be operated in conjunction with a boiler/stage controller lacking the derivative action control. In some cases, this may allow the system controller 350 to be provided as a retrofit controller onto an existing system.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A method of operating a multistage modulating boiler system, the multi-stage modulating boiler system including two or more stages of modulating boilers, the multi-stage modulating boiler system adapted to provide heat to a circulating fluid heated by the multi-stage modulating boiler system and to maintain a first temperature setpoint, the method comprising:

receiving an indication that a stage of the multi-stage modulating boiler system should be activated and whether the stage is currently a first stage of the multi-stage modulating boiler to be activated;

receiving a normal firing rate for the stage, the normal firing rate is based on an error signal that is related to a deviation between the first temperature set point and a temperature of the circulating fluid in the multi-stage modulating boiler system;

activating the stage at the normal firing rate if the stage is not the first stage of the multi-stage boiler to be activated;

activating the stage at a first firing rate if the stage is the first stage of the multi-stage boiler to be activated, wherein the first firing rate is less than the normal firing rate;

maintaining the first firing rate for a period of time unless a predefined condition that is related to a system temperature occurs during the period of time; and activating the stage at the normal firing rate after the period of time expires.

2. The method of claim 1 wherein the predefined condition includes when the temperature of the circulating fluid in the multi-stage modulating boiler system drops below a predetermined level.

3. The method of claim 1 wherein the predefined condition includes when a rate of change for a sensed temperature for the circulating fluid in the multi-stage modulating boiler system rises above a predetermined level.

4. The method of claim 1 wherein:

the multi-stage modulating boiler system includes a modulating boiler stage for heating the circulating fluid, the modulating boiler stage having a primary heat exchanger and a bypass temperature sensor for sensing a bypass temperature of the circulating fluid entering the primary heat exchanger; and the predefined condition includes a likelihood of condensation within the primary heat exchanger of the modulating boiler stage.

5. The method of claim 4 wherein the likelihood of condensation is predicted based upon sensing of the bypass temperature.

6. The method of claim 4 wherein:

the modulating boiler stage includes a secondary heat exchanger associated with the primary heat exchanger and an inlet temperature sensor for sensing an inlet temperature of the circulating fluid entering the secondary heat exchanger; and the likelihood of condensation is predicted based upon sensing of the inlet temperature.

7. The method of claim 1 wherein the first firing rate is set independent of the normal firing rate.

8. A controller for a multi-stage modulating boiler system having one or more modulating boiler stages, the controller configured to perform the steps of:

receiving an indication that a stage of the multi-stage modulating boiler system should be activated and whether the stage is currently a first stage of the multi-stage modulating boiler to be activated;

receiving a normal firing rate for the stage, the normal firing rate is based, at least in part, on a heat load on the multi-stage modulating boiler system;

activating the stage at the normal firing rate if the stage is not the first stage of the multi-stage boiler to be activated;

activating the stage at a first firing rate if the stage is the first stage of the multi-stage modulating boiler to be activated, wherein the first firing rate is less than the normal firing rate;

maintaining the first firing rate for a period of time unless a predefined condition that is related to a system temperature occurs during the period of time; and activating the stage at the normal firing rate after the period of time expires.

9. A controller as in claim 8 wherein:

the multi-stage modulating boiler system includes a boiler stage for heating a circulating fluid, the boiler stage having a primary heat exchanger and a bypass temperature sensor for sensing a bypass temperature of the circulating fluid entering the primary heat exchanger; and the predefined condition includes a likelihood of condensation within the primary heat exchanger.

10. A controller as in claim 9 wherein:

the multi-stage modulating boiler system includes a secondary heat exchanger associated with the primary heat exchanger and an inlet temperature sensor for sensing an inlet temperature of the circulating fluid entering the secondary heat exchanger; and the likelihood of condensation is predicted based upon sensing of the inlet temperature.

\* \* \* \* \*